(12) United States Patent
Kawamura

(10) Patent No.: US 11,087,926 B2
(45) Date of Patent: Aug. 10, 2021

(54) MULTILAYER CERAMIC CAPACITOR AND MANUFACTURING METHOD OF MULTILAYER CERAMIC CAPACITOR

(71) Applicant: TAIYO YUDEN CO., LTD., Tokyo (JP)

(72) Inventor: Chie Kawamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 65 days.

(21) Appl. No.: 16/056,201

(22) Filed: Aug. 6, 2018

(65) Prior Publication Data

US 2019/0051460 A1 Feb. 14, 2019

(30) Foreign Application Priority Data

Aug. 10, 2017 (JP) .............................. JP2017-155747
May 7, 2018 (JP) .............................. JP2018-089041

(51) Int. Cl.
*H01G 4/30* (2006.01)
*H01G 4/12* (2006.01)
(Continued)

(52) U.S. Cl.
CPC ............ *H01G 4/30* (2013.01); *C04B 35/4682* (2013.01); *C04B 35/6264* (2013.01); *C04B 35/6342* (2013.01); *H01G 4/008* (2013.01); *H01G 4/0085* (2013.01); *H01G 4/1227* (2013.01); *C04B 2235/3418* (2013.01); *C04B 2235/5409* (2013.01); *C04B 2235/5454* (2013.01); *C04B 2235/6025* (2013.01);
(Continued)

(58) Field of Classification Search
CPC ........... H01G 4/005; H01G 4/30; H01G 4/12; H01G 4/1227; H01G 4/008; H01G 4/0085; C04B 35/6264; C04B 35/4682; C04B 35/6342
USPC ....... 361/301.4, 321.2, 303, 321.1, 311, 320, 361/305
See application file for complete search history.

(56) References Cited

U.S. PATENT DOCUMENTS

2004/0233612 A1 11/2004 Sugimoto et al.
2006/0208575 A1 9/2006 Orimo et al.
(Continued)

FOREIGN PATENT DOCUMENTS

CN 1525503 A 9/2004
CN 1877763 A 12/2006
(Continued)

OTHER PUBLICATIONS

A First Office Action issued by the State Intellectual Property Office of China dated Feb. 26, 2021, for Chinese counterpart application No. 201810907065.2 (8 pages).

*Primary Examiner* — Arun Ramaswamy
(74) *Attorney, Agent, or Firm* — Law Office of Katsuhiro Arai

(57) ABSTRACT

A multilayer ceramic capacitor includes: a multilayer structure in which each of dielectric layers and each of internal electrode layers are alternately stacked, a main component of the dielectric layers being ceramic, wherein: a second-phase has an average diameter of 150 nm or less and is in at least one of interfaces between the dielectric layers and the internal electrode layers; and at least one of the internal electrode layers includes a grain of which a main component is ceramic.

12 Claims, 7 Drawing Sheets

(51) Int. Cl.
*H01G 4/008* (2006.01)
*C04B 35/626* (2006.01)
*C04B 35/468* (2006.01)
*C04B 35/634* (2006.01)

(52) U.S. Cl.
CPC ............... *C04B 2235/6562* (2013.01); *C04B 2235/663* (2013.01); *C04B 2237/68* (2013.01)

(56) References Cited

U.S. PATENT DOCUMENTS

| | | |
|---|---|---|
| 2009/0059471 A1 | 3/2009 | Fukuda et al. |
| 2014/0049876 A1 | 2/2014 | Yao |
| 2014/0085769 A1* | 3/2014 | Ueda ................... C04B 35/4682 361/301.4 |
| 2014/0177133 A1 | 6/2014 | Lee et al. |
| 2015/0279565 A1 | 10/2015 | Teraoka et al. |

FOREIGN PATENT DOCUMENTS

| | | |
|---|---|---|
| CN | 101147216 A | 3/2008 |
| CN | 104246929 A | 12/2014 |
| CN | 103563024 B | 8/2016 |
| EP | 1792881 A1 | 6/2007 |
| JP | 2012028683 A * | 2/2012 |
| JP | 2014123698 A | 7/2014 |
| JP | 2017120871 A * | 7/2017 |
| WO | 2013018789 A1 | 2/2013 |

* cited by examiner

MULTILAYER CERAMIC CAPACITOR AND MANUFACTURING METHOD OF MULTILAYER CERAMIC CAPACITOR

CROSS-REFERENCE TO RELATED APPLICATION

This application is based upon and claims the benefit of priority of the prior Japanese Patent Application No. 2017-155747, filed on Aug. 10, 2017 and the prior Japanese Patent Application No. 2018-089041, filed on May 7, 2018, the entire contents of which are incorporated herein by reference.

FIELD

A certain aspect of the present invention relates to a multilayer ceramic capacitor and a manufacturing method of a multilayer ceramic capacitor.

BACKGROUND

Recently, electronic devices such as smart phones or mobile phones are being downsized. Thereby, electronic components mounted on the electronic devices are rapidly downsized. For example, in a multilayer ceramic capacitor, it is demanded that thicknesses of dielectric layers and internal electrode layers are reduced, for the purpose of securing desirable characteristic and reducing a chip size. There is disclosed a technology in which a second-phase is controlled in order to achieve desirable characteristic in the multilayer ceramic capacitor (for example, see Japanese Patent Application Publication No. 2014-123698 and International Publication No. WO2013/018789).

SUMMARY OF THE INVENTION

When the thickness of the internal electrode layers is reduced, it is difficult to achieve a high continuity modulus. And so, it is thought that a co-material is added to the internal electrode layers, and contraction of the internal electrode layers is delayed. However, the co-material may diffuse into the dielectric layers during the sintering, and a relative dielectric constant may be reduced. Above-mentioned patent documents do not disclose a solution of the problem.

The present invention has a purpose of providing a multilayer ceramic capacitor and a manufacturing method of a multilayer ceramic capacitor that are capable of suppressing reduction of a relative dielectric constant of dielectric layers.

According to an aspect of the present invention, there is provided a multilayer ceramic capacitor including: a multilayer structure in which each of dielectric layers and each of internal electrode layers are alternately stacked, a main component of the dielectric layers being ceramic, wherein: a second-phase has an average diameter of 150 nm or less and is in at least one of interfaces between the dielectric layers and the internal electrode layers; and at least one of the internal electrode layers includes a grain of which a main component is ceramic.

According to another aspect of the present invention, there is provided a manufacturing method of a multilayer ceramic capacitor including: a first step of forming a pattern of a metal conductive paste on a green sheet including ceramic powders and a Si material, a main component of the metal conductive paste being metal powders of which an average grain diameter is 100 nm or less and of which a standard deviation of grain size distribution is 1.5 or less, the metal conductive paste including ceramic powders as a co-material, an average grain diameter of the co-material being 10 nm or less, a standard deviation of grain size distribution of the co-material being 5 or less; and a second step of forming internal electrode layers by sintering the metal powders and forming dielectric layers by sintering the ceramic powders of the green sheet, by baking a ceramic multilayer structure obtained by stacking a plurality of layer units obtained by the first step, wherein: in the second step, a second-phase having an average diameter of 150 nm or less is formed in at least one of interfaces between the dielectric layers and the internal electrode layers; and in the second step, a grain of which a main component is ceramic is formed in at least one of the internal electrode layers.

DETAILED DESCRIPTION

A description will be given of an embodiment with reference to the accompanying drawings.

Embodiment

Figure 1:
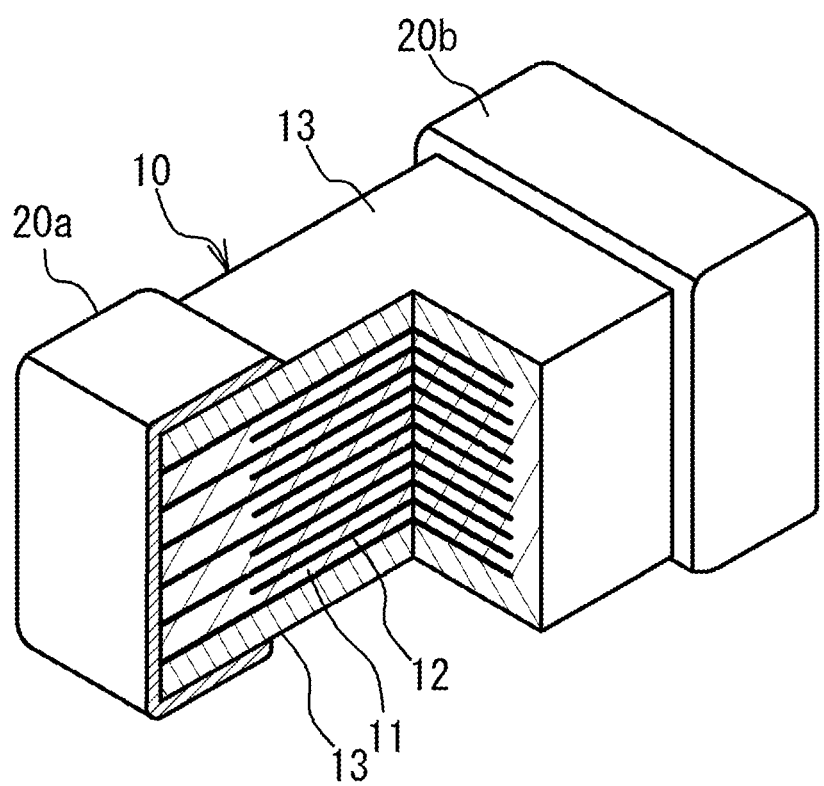
FIG. 1 illustrates a partial perspective view of a multilayer ceramic capacitor.

FIG. 1 illustrates a partial perspective view of a multilayer ceramic capacitor 100 in accordance with an embodiment. As illustrated in FIG. 1, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. In four faces other than the two edge faces of the multilayer chip 10, two faces other than an upper face and a lower face of the multilayer chip 10 in a stacking direction are referred to as side faces. The external electrodes 20a and 20b extend to the upper face, the lower face and the two side faces. However, the external electrodes 20a and 20b are spaced from each other.

The multilayer chip 10 has a structure designed to have dielectric layers 11 and internal electrode layers 12 alternately stacked. A main component of the dielectric layer 11 is a ceramic material acting as a dielectric material. A main component of the internal electrode layers 12 is a metal material such as a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in the stacking direction. The upper face and the lower face of the multilayer structure that are the internal electrode layers 12 are covered by cover layers 13. A main component of the cover layer 13 is a ceramic material. For example, a main component ceramic of the cover layer 13 is the same as that of the dielectric layer 11.

For example, the multilayer ceramic capacitor 100 may have a length of 0.2 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. A thickness of the internal electrode layer 12 is, for example, 0.5 μm or less. It is preferable that the thickness of the internal electrode layer 12 is 0.3 μm or less. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

For the purpose of downsizing the multilayer ceramic capacitor 100 and enlarging the capacity of the multilayer ceramic capacitor 100, reduction of thicknesses of the dielectric layer 11 and the internal electrode layer 12 is demanded. However, when the thickness of the internal electrode layer 12 is reduced, it is difficult to maintain a high continuity modulus. The reasons are as follows. In a case where the internal electrode layer 12 is formed by sintering metal powders, when the sintering progresses, the metal powder tends to be spheroidized in order to minimize surface energy. The metal component of the internal electrode layer 12 is sintered earlier than the main component ceramic of the dielectric layer 11. Therefore, when the temperature is increased to a value at which the main component ceramic of the dielectric layer 11 is sintered, the metal component of the internal electrode layer 12 is excessively sintered and tends to be spheroidized. In this case, when there is a reason (defect) of break, the internal electrode layer 12 is broken from the defect and the continuity modulus decreases. When the thickness of the dielectric layers 11 and the internal electrode layers 12 is reduced, the continuity modulus may be further reduced.

Figure 2:
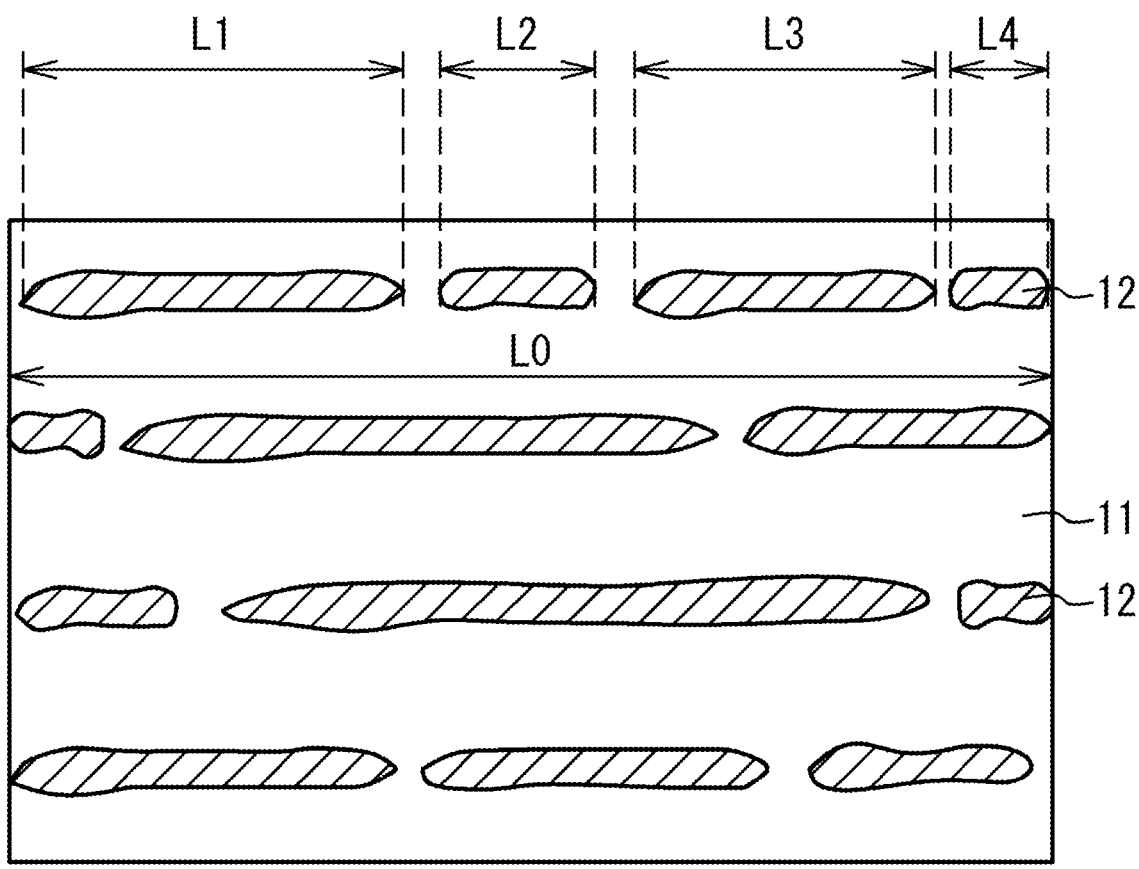
FIG. 2 illustrates a continuity modulus.

FIG. 2 illustrates the continuity modulus. As illustrated in FIG. 2, in an observation area having a length L0 in the internal electrode layer 12, lengths L1, L2 to Ln of metal portions are measured and summed. A ratio of the metal portions $\Sigma Ln/Lo$ can be defined as the continuity modulus.

And so, it is thought that a co-material of which a main component is ceramic is added to the internal electrode layer 12, and the contraction of the internal electrode layer 12 is delayed. It is thought that from a viewpoint of reduction of the thickness of the internal electrode layers 12, highly distributed metal conductive pastes including a small diameter material having sharp grain size distribution are baked as the main component metal and the co-material structuring the internal electrode layers 12. However, a relative dielectric constant of a micro size co-material is low. Therefore, when the micro size co-material is diffused into the dielectric layers 11, an electrostatic capacity of the multilayer ceramic capacitor 100 may be reduced. And so, it is preferable that the micro size co-material having a low relative dielectric constant does not diffuse into the dielectric layers 11 from the internal electrode layers 12.

Figure 3:
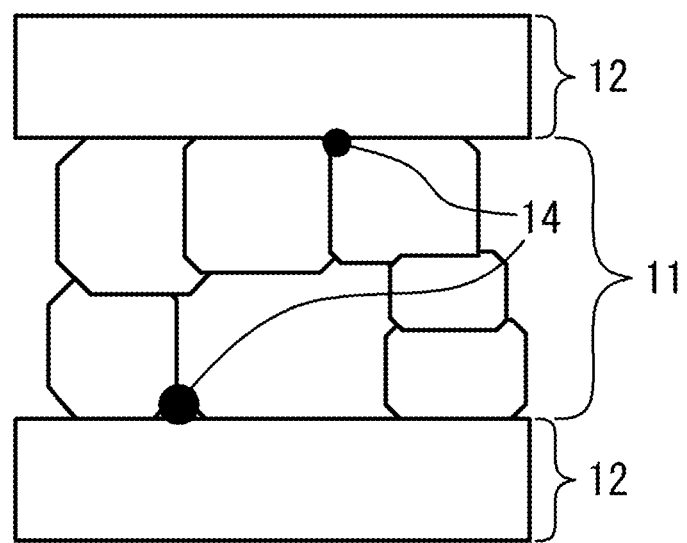
FIG. 3 illustrates a second-phase.

In the embodiment, as illustrated in FIG. 3, at least one of second-phases is located in an interface between the dielectric layers 11 and the internal electrode layers 12. The second-phase is a phase having a different crystal from a crystal of a main component ceramic of the dielectric layers 11 and from a crystal of a main component metal of the internal electrode layers 12. For example, the second-phase is a phase having a Si (silicon) oxide. Hereinafter, the second-phase in the interface between the dielectric layers 11 and the internal electrode layers 12 is referred to as a second-phase 14.

When the second-phase 14 is located in the interface between the dielectric layers 11 and the internal electrode layer 12, diffusion of the co-material into the dielectric layers 11 is suppressed. When a diameter of the second-phase 14 is small, it is possible to distribute the second-phase 14 in the interface between the dielectric layers 11 and the internal electrode layers 12. And, the diffusion of the co-material is suppressed more. And so, in the embodiment, an average diameter of the second-phase 14 is 150 nm or less. Thus, the diffusion of the dielectric material that is used as the co-material and has a small relative dielectric constant to the dielectric layers 11 is suppressed. And, the dielectric material is remained in the internal electrode layers 12. Therefore, without reducing the relative dielectric constant of the dielectric layers 11, the continuity modulus of the internal electrode layers 12 gets higher. And preferable bias characteristic is achieved. Even if the thickness of the dielectric layers 11 and the internal electrode layers 12 is reduced and a large number of the dielectric layers 11 and the internal electrode layers 12 are stacked, a crack after baking is suppressed. And it is possible to contribute to the improvement of the reliability.

When the amount of the second-phase 14 is small in the interface between the dielectric layers 11 and the internal electrode layers 12, it may not be necessarily possible to sufficiently suppress the diffusion of the co-material. And so, it is preferable that a total area of the second-phases 14 is 0.7% or more with respect to a total area of the dielectric layers 11, in the cross section of the dielectric layers 11 and the internal electrode layers 12 in the stacking direction. In this case, it is possible to sufficiently suppress the diffusion of the co-material. It is more preferable that the total area of the second-phases 14 is 0.8% or more with respect to the total area of the dielectric layers 11. It is still more preferable that the total area of the second-phases 14 is 0.9% or more with respect to the total area of the dielectric layers 11.

On the other hand, when the amount of the second-phase 14 is excessively large in the interface between the dielectric layers 11 and the internal electrode layers 12, the ratio of second-phases having a low relative dielectric constant is large. Therefore, the relative dielectric constant of the dielectric layers 11 may be reduced. And so, it is preferable that the total area of the second-phases 14 is 5.4% or less with respect to the total area of the dielectric layers 11, in the cross section of the dielectric layers 11 and the internal electrode layers 12 in the stacking direction. In this case, the ratio of the second-phases having a low relative dielectric constant is not excessively high, and the reduction of the relative dielectric constant of the dielectric layers 11 is suppressed. It is more preferable that the total area of the second-phases 14 is 5.1% or less with respect to the total area of the dielectric layers 11. It is still more preferable that the total area of the second-phases 14 is 5.0% or less.

When the diameter of the second-phase 14 is large with respect to the grain diameter of the main component ceramic of the dielectric layers 11, the number of the second-phases 14 that can be located in the interface between the dielectric layers 11 and the internal electrode layers 12 is small. Therefore, the crack may occur. And so, it is preferable that the average diameter of the second-phase 14 is 35% or less with respect to the average grain diameter of the main component ceramic of the dielectric layers 11. In this case, the number of the second-phases 14 that can be located in the interface between the dielectric layers 11 and the internal electrode layers 12 is large. And the occurrence of the crack may be suppressed. It is preferable that the average diameter of the second-phases 14 is 32% or less with respect to the average grain diameter of the main component ceramic of the dielectric layers 11. It is more preferable that the average diameter of the second-phases 14 is 30% or less with respect to the grain diameter of the main component ceramic of the dielectric layers 11.

Figure 4A:
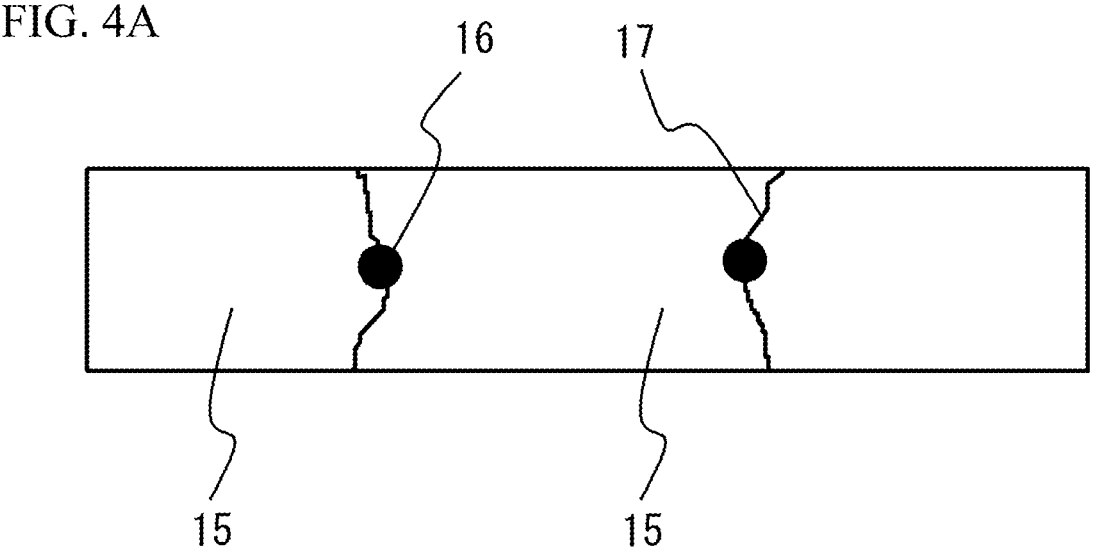
FIG. 4A illustrates an internal electrode layer in a case where a crystal grain diameter is large.
Figure 4B:
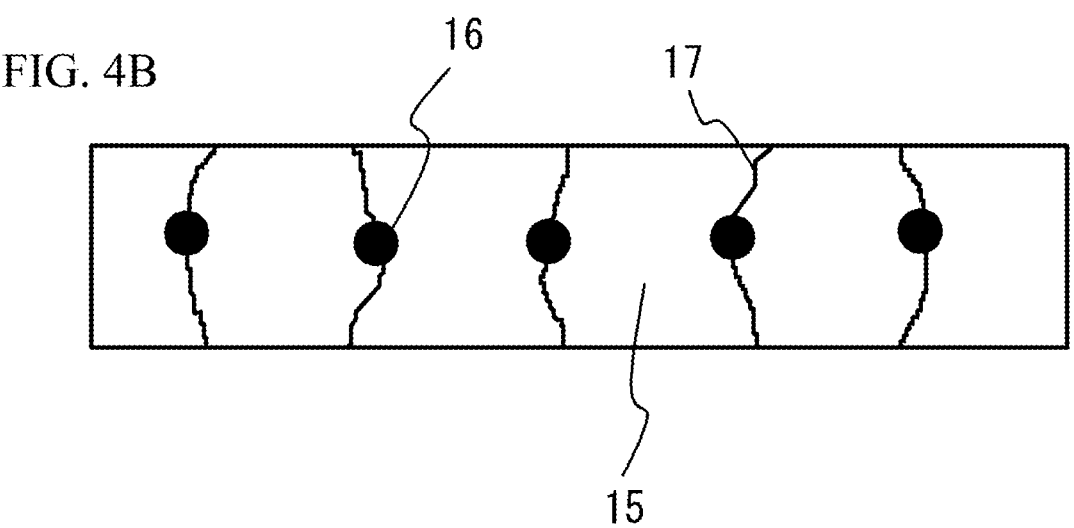
FIG. 4B illustrates an internal electrode layer in a case where a crystal grain diameter is small.

It is preferable that the crystal grain diameter of the internal electrode layers 12 is small. FIG. 4A illustrates the internal electrode layer 12 in a case where the crystal grain diameter is large. FIG. 4B illustrates the internal electrode layer 12 in a case where the crystal grain diameter is small. As illustrated in FIG. 4A and FIG. 4B, when a crystal grain 15 is small, the co-material tends to be remained in the internal electrode layers 12. For example, when the crystal grains 15 is small, the number of the crystal grain boundaries 17 is large. In this case, it is thought that the co-material is remained in the crystal grain boundary 17, and the number of the grains 16 of which a main component is ceramic is large in the whole of the internal electrode layers 12. The grains 16 is formed by baking the co-material In concrete, it is preferable that an area ratio of the grains 16 is 10% or more by reducing the crystal grain diameter of the internal electrode layers 12, in the cross section of the internal electrode layers 12 in the stacking direction of the dielectric layers 11 and the internal electrode layers 12. For example, the cross section is a cross section in a plane formed by the stacking direction of the dielectric layers 11 and the internal electrode layers 12 and a facing direction between the external electrode 20a and the external electrode 20b. In the structure, the amount of the remained co-material is large. Therefore, the diffusion of the co-material into the dielectric layers 11 is suppressed. The reduction of the relative dielectric constant of the dielectric layers 11 is suppressed. The excessive sintering of the metal component of the internal electrode layers 12 during the sintering is suppressed. And the breakdown of the internal electrode layer 12 is suppressed. Accordingly, it is possible to suppress the reduction of the continuity modulus of the internal electrode layers 12. It is preferable that the above-mentioned area ratio is 15% or more. It is possible to calculate the area ratio from the total area of the internal electrode layers 12 and the area of the grains 16 of which a main component is ceramic, with use of an SEM image or the like of the cross section of the internal electrode layers 12.

When a sufficient amount of the co-material is remained in the internal electrode layers 12, without diffusing into the dielectric layers 11, the co-materials gather in the internal electrode layers 12. In concrete, it is thought that the co-materials near the center portion of the internal electrode layers 12 collects the co-material around the center portion and achieve grain growth. Therefore, the co-material is remained in the center portion of the internal electrode layers 12 in the thickness direction. In this case, the grains 16 exist neither in the uppermost 5% nor in the lowermost 5% in the internal electrode layers 12 in the thickness direction. It is therefore preferable that the grains 16 exist neither in the uppermost 5% nor in the lowermost 5% in the internal electrode layers 12 in the thickness direction.

Figure 5:
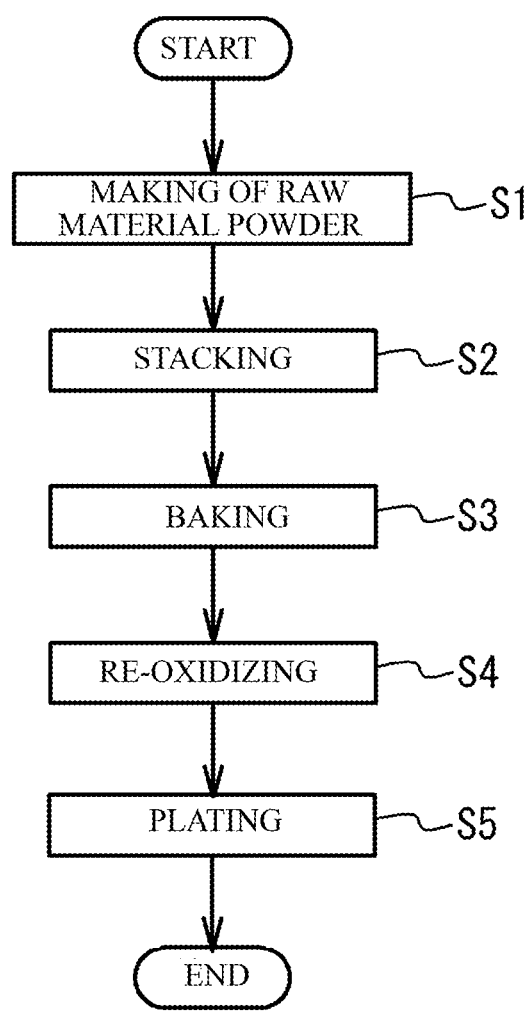
FIG. 5 illustrates a manufacturing method of a multilayer ceramic capacitor.

Next, a description will be given of a manufacturing method of the multilayer ceramic capacitor 100. FIG. 5 illustrates a manufacturing method of the multilayer ceramic capacitor 100.

(Making Process of a Raw Material Powder)

As illustrated in FIG. 5, a dielectric material for forming the dielectric layer 11 is prepared. An A site element and a B site element of the dielectric layer 11 are generally included in the dielectric layer 11 in a shape of sintered structure of grains of $ABO_3$. For example, $BaTiO_3$ is tetragonal compound having a perovskite structure and has a high relative dielectric constant. $BaTiO_3$ can be obtained by reacting a titanium material such as titanium dioxide with a barium material such as barium carbonate and synthesizing barium titanate. Various methods are known as a synthesizing ceramic of the dielectric layer 11. For example, a solid-phase method, a sol-gel method, a hydrothermal method and so on are known. In the embodiment, any one of them can be adopted.

Next, additive compound may be added to a ceramic powder material, in accordance with purposes. The additive compound may be an oxide of Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Zn (zinc), Li (lithium), B (boron), Na (sodium), K (potassium) and Si (silicon), or glass. Among the additive compound, at least one of Si, Mn, V, Ni, Zn, Li, B, Y, Dy, Ho, Yb and a part of Ba included in the ceramic powders is a second-phase component and forms the second-phase 14 after sintering.

In the embodiment, it is preferable that compound including additive compound is mixed with the ceramic grains structuring the dielectric layer 11. The resulting ceramic grains with the additive compound are calcined within a temperature range of 820 degrees C. to 1150 degrees C. Then, the ceramic grains are wet-blended with the additive compound. After that, the ceramic grains with the additive compound are dried and crushed. And, desirable ceramic powder is prepared. For example, it is preferable that an average grain diameter of the ceramic powder is 50 nm to 300 nm from a viewpoint of reducing the thickness of the dielectric layer 11. For example, the grain diameter of the resulting ceramic may be adjusted by crushing the resulting ceramic powder. Alternatively, the grain diameter may be adjusted by performing the crushing and a classifying process.

(Stacking Process)

Next, a binder such as polyvinyl butyral (PVB) resin, an organic solvent such as ethanol or toluene, and a plasticizer such as dioctyl phthalate (DOP) are added to the resulting dielectric material and wet-blended. With use of the resulting slurry, a strip-shaped dielectric green sheet with a thickness of 0.8 µm or less is coated on a base material by, for example, a die coater method or a doctor blade method, and then dried.

Then, a pattern of the internal electrode layer 12 is provided on the surface of the dielectric green sheet by printing a conductive paste for forming an internal electrode layer with use of screen printing or gravure printing. The conductive paste includes an organic binder. Thus, internal electrode layer patterns that are alternately extracted to the pair of external electrodes are provided. A metal material of the metal conductive paste has an average grain diameter of 100 nm or less. A standard deviation of the grain diameter is 15 or less. In this case, sharp grain size distribution is obtained. It is preferable that the average grain diameter is 100 nm or less. It is more preferable that the average grain diameter is 70 nm or less. It is preferable that the standard deviation of the grain diameter is 15 or less. It is more preferable that the standard deviation of the grain diameter is 12 or less. An inclination of accumulated grain size distribution is 8 or more. The inclination of the accumulated grain size distribution can be defined as an inclination (=1/(log D80−log D20)) between D20 and D80 in a case where the accumulated grain size distribution is plotted in a logarithmic manner.

As a co-material, ceramic grains are added to the metal conductive paste. A main component ceramic of the ceramic grains is not limited. However, it is preferable that a main component ceramic of the co-material is the same as that of the dielectric layer 11. For example, barium titanate may be evenly dispersed. For example, ceramic grains of which an average grain diameter is 10 nm or less are used as the co-material. The standard deviation of the grain diameter is 5 or less. Thus, sharp grain size distribution is achieved. It is preferable that the average grain diameter is 15 nm or less. It is more preferable that the average grain diameter is 10 nm or less. It is preferable that the standard deviation of the grain diameter is 5 or less. It is more preferable that the standard deviation of the grain diameter is 3 or less. It is preferable that the inclination of the accumulated grain size distribution is 7 or more. The inclination of the accumulated grain size distribution can be defined as an inclination (=1/(log D80-log D20)) between D20 and D80 in a case where the accumulated grain size distribution is plotted in a logarithmic manner.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets, which are to be the cover layers 13, are provided on the stacked dielectric green sheets and under the stacked dielectric green sheets. The cover sheets are sandwiched by silicone rubber sheets having a base made of PET (polyethylene terephthalate). And the cover sheet are compressed. The resulting multilayer structure is cut into a predetermined size (for example, 1.0 mm×0.5 mm). After that, a metal conductive paste, which is to be the ground layer of the external electrodes 20a and 20b is coated on the both edge faces of the resulting multilayer structure by a dip method or the like and is dried. Thus, a compact of the multilayer ceramic capacitor 100 is obtained.

(Baking Process)

Next, after removing the binder in $N_2$ atmosphere at 250 degrees C. to 500 degrees C., the resulting compact is baked for ten minutes to 2 hours in a reductive atmosphere, of which an oxygen partial pressure is $10^{-5}$ to $10^{-8}$ atm, in a temperature range of 1100 degrees C. to 1300 degrees C. Thus, each compound structuring the dielectric green sheet is sintered. In this manner, the multilayer ceramic capacitor 100 is obtained. By adjusting the Si material and the baking condition, it is possible to form the second-phase 14 in the interface between the dielectric layers 11 and the internal electrode layers 12. For example, it is possible to form the second-phase 14 in the interface between the dielectric layers 11 and the internal electrode layers 12, by using micro grains having a specific surface area of 200 $m^2$/g or more as $SiO_2$ acting as the Si material and decreasing the average speed of the temperature increasing from 1000 degrees C. to the maximum temperature. It is possible to adjust the average diameter of the second-phase 14 formed in the interface between the dielectric layers 11 and the internal electrode layers 12 to 150 nm or less, by adjusting the baking condition. For example, when the maximum temperature is reduced, the average diameter of the second-phase 14 is 150 nm or less.

It is possible to adjust the amount of the remained co-material in the internal electrode layers 12 by adjusting the baking condition. In concrete, when a speed of temperature increasing in the baking process is enlarged, the main component metal is sintered before the co-material is extruded from the metal conductive paste. Therefore, the co-material tends to exist in the internal electrode layer 12. For example, it is preferable that the average speed of the temperature increasing from a room temperature to a maximum temperature in the baking process is 30 degrees C./minute or more in order to enlarge the amount of the remained co-material in the internal electrode layers 12. It is more preferable that the average speed is 45 degrees C./minute or more. When the average speed of the temperature increasing is excessively large, an organic component existing in the compact is not sufficiently removed. And a defect such as a crack may occur in the baking process. Alternatively, when a difference may occur between sintering of an inner portion of the compact and sintering of an outer portion of the compact, sufficient densification is not achieved. And a defect such as reduction of the electrostatic capacity may occur. And so, it is preferable that the average speed of the temperature increasing is 80 degrees C./minute or less. It is more preferable that the average speed of the temperature increasing is 65 degrees C./minute or less.

(Re-Oxidizing Process)

After that, a re-oxidizing process may be performed at 600 degrees C. to 1000 degrees C. in $N_2$ gas atmosphere.

(Plating Process)

After that, metal layers such as Cu, Ni or Su are coated on the ground layers of the external electrodes 20a and 20b by a plating process.

With the manufacturing method of the multilayer ceramic capacitor in accordance with the embodiment, a small diameter material of which grain size distribution is sharp is used as the main component metal of the internal electrode layer 12 and the co-material. Therefore, highly distributed metal conductive paste is obtained. And, a partial mixing of a large diameter material is suppressed. When the highly distributed metal conductive paste is used, diffusion of the co-material into the dielectric layer 11 in the baking process is suppressed. And the co-material exists in the internal electrode layer 12. With the manufacturing method of the multilayer ceramic capacitor, it is possible to form the second-phases 14 of which the average diameter is 150 nm or less, in the interface between the dielectric layers 11 and the internal electrode layers 12. When the average diameter of the second-phase 14 is 150 nm or less, it is possible to distribute the second-phases 14. Therefore, the diffusion of the co-material into the dielectric layers 11 is suppressed. Thus, it is possible to remain the dielectric material that is used as the co-material and has a low relative dielectric constant, in the internal electrode layers 12. Therefore, the internal electrode layers 12 having a high continuity modulus is formed without reducing the relative dielectric constant of the dielectric layers 11. And preferable bias characteristic is achieved. Even if the thickness of the internal electrode layers 12 is reduced and the large number of the internal electrode layers 12 are stacked, the occurrence of the crack is suppressed and the reliability is improved.

When the grain diameter of the Si material added to the dielectric material is reduced, it is possible to reduce the average diameter of the second-phases 14 formed after the baking. For example, when the specific surface area of the Si material is 200 m$^2$/g or more, it is possible to adjust the average diameter of the second-phases 14 to 150 nm or less.

When the amount of Si material added to the dielectric material is small, the amount of the second-phase 14 is small in the interface between the dielectric layers 11 and the internal electrode layers 12. In this case, it may not be necessarily possible to sufficiently suppress the diffusion of the co-material. And so, it is preferable that the amount of the Si material added to the dielectric material has a lower limit. In concrete, it is preferable that the amount of the Si material added to the dielectric material is 0.3 mol or more if converted into SiO$_2$, on a presumption that the amount of the main component ceramic of the dielectric material is 100 mol. In this case, for example, the total area of the second-phases 14 is 0.9% or more with respect to the total area of the dielectric layers 11, in the cross section of the dielectric layers 11 and the internal electrode layers 12 in the stacking direction. It is preferable that the amount of the Si material added to the dielectric material is 0.4 mol or more if converted into SiO$_2$, on a presumption that the amount of the main component ceramic of the dielectric material is 100 mol.

On the other hand, when the amount of the Si material added to the dielectric material is large, the amount of the second-phase 14 is large in the interface between the dielectric layers 11 and the internal electrode layers 12. In this case, the ratio of second-phases having a low relative dielectric constant is large. Therefore, the relative dielectric constant of the dielectric layers 11 may be reduced. And so, it is preferable that the amount of the Si material added to the dielectric material has an upper limit. In concrete, it is preferable that the amount of the Si material added to the dielectric material is 2.1 mol or less if converted into SiO$_2$, on a presumption that the amount of the main component ceramic of the dielectric material is 100 mol. In this case, for example, the total area of the second-phases 14 is 5.1% or less with respect to the total area of the dielectric layers 11, in the cross section of the dielectric layers 11 and the internal electrode layers 12 in the stacking direction. On a presumption that the amount of the main component ceramic of the dielectric material is 100 mol, it is preferable that the amount of the Si material added to the dielectric material is 2.0 mol or less if converted into SiO$_2$. It is more preferable that the amount of the Si material added to the dielectric material is 1.0 mol or less if converted into SiO$_2$.

When the diameter of the second-phase 14 is large with respect to the grain diameter of the main component ceramic of the dielectric layers 11, the number of the second-phases 14 that can be located in the interface between the dielectric layers 11 and the internal electrode layers 12 may be small. Therefore, the crack may occur. And so, it is preferable that the average diameter of the second-phase 14 is 35% or less with respect to the average grain diameter of the main component ceramic of the dielectric layers 11. In this case, the number of the second-phases that can be located in the interface between the dielectric layers 11 and the internal electrode layers 12 is large. And the occurrence of the crack may be suppressed. It is preferable that the average diameter of the second-phases 14 is 30% or less with respect to the average grain diameter of the main component ceramic of the dielectric layers 11.

It is preferable that the area ratio of the grains 16 of which the main component is ceramic is 10% or more, in the cross section of the internal electrode layers 12 in the stacking direction of the dielectric layers 11 and the internal electrode layers 12 after the baking. When the co-material is remained in the internal electrode layers 12, the excessive sintering of the metal component of the internal electrode layers 12 during the baking is suppressed. And the breaking of the internal electrode layers 12 is suppressed. Therefore, the reduction of the continuity modulus of the internal electrode layers 12 is suppressed. It is preferable that the above-mentioned area ratio is 15% or more. And, it is preferable that the grains 16 exist neither in the uppermost 5% nor in the lowermost 5% in the internal electrode layers 12 in the thickness direction.

Examples

The multilayer ceramic capacitors in accordance with the embodiment were made and the property was measured.

A necessary additive compound was added to a barium titanate powder of which an average grain diameter is 100 nm (a specific surface area of 10 m$^2$/g). The resulting barium titanate powder was sufficiently wet-blended and crushed by a ball mil. Thus, the dielectric material was obtained. In an example 1, the amount of the Si material added to the dielectric material was 0.3 mol if converted into SiO$_2$, on a presumption that the amount of barium titanate was 100 mol. In an example 2, the amount of the Si material added to the dielectric material was 0.4 mol if converted into SiO$_2$, on a presumption that the amount of barium titanate was 100 mol. In an example 3, the amount of the Si material added to the dielectric material was 0.7 mol if converted into SiO$_2$, on a presumption that the amount of barium titanate was 100 mol. In an example 4, the amount of the Si material added to the dielectric material was 2.0 mol if converted into SiO$_2$, on a presumption that the amount of barium titanate was 100 mol.

In an example 5, the amount of the Si material added to the dielectric material was 2.1 mol if converted into $SiO_2$, on a presumption that the amount of barium titanate was 100 mol. In an example 6, the amount of the Si material added to the dielectric material was 0.7 mol if converted into $SiO_2$, on a presumption that the amount of barium titanate was 100 mol. In an example 7, the amount of the Si material added to the dielectric material was 0.4 mol if converted into $SiO_2$, on a presumption that the amount of barium titanate was 100 mol. Non-porous $SiO_2$ having the specific surface area of 200 $m^2/g$ or more was used as the Si material.

In a comparative example 1, the amount of the Si material added to the dielectric material was 2.5 mol if converted into $SiO_2$, on a presumption that the amount of barium titanate was 100 mol. In comparative examples 2 and 3, the amount of the Si material added to the dielectric material was 0.4 mol if converted into $SiO_2$, on a presumption that the amount of barium titanate was 100 mol. In a comparative example 4, the amount of the Si material added to the dielectric material was 0.2 mol if converted into $SiO_2$, on a presumption that the amount of barium titanate was 100 mol. In the comparative examples 1 and 4, non-porous $SiO_2$ having the specific surface area of 200 $m^2/g$ or more was used as the Si material. In the comparative examples 2 and 3, non-porous $SiO_2$ having the specific surface area of 50 $m^2/g$ or more was used as the Si material.

An organic binder and a solvent were added to the dielectric material. And dielectric green sheets were made by a doctor blade method. A thickness of the dielectric green sheet was 0.8 μm. The organic binder was polyvinyl butyral (PVB) resin or the like. The solvent was ethanol, toluene or the like. And a plasticizer and so on were added.

Next, the conductive paste for forming the internal electrode layer was formed by a planetary boll mill. The conductive paste included a main component metal (Ni) powder of the internal electrode layer 12 (50 wt % of Ni solid content), 10 weight part of a co-material (barium titanate), 5 weight part of binder (ethyl cellulose), a solvent and an auxiliary as needed. As shown in Table 1, in the examples 1 to 6 and the comparative examples 1 to 4, the average grain diameter of the main component metal powder was 70 nm (a specific surface area was 10 $m^2/g$). The standard deviation of the grain diameter of the main component metal powder was 12. The inclination of the accumulated grain size distribution was 8. The average grain diameter of the co-material was 8.6 nm (a specific surface area was 110 $m^2/g$). The standard deviation of the grain diameter of the co-material was 2.7. The inclination of the accumulated grain size distribution of the co-material was 7. In the example 7, the average grain diameter of the main component metal powder was 120 nm (a specific surface area was 6 $m^2/g$). The standard deviation of the grain diameter of the main component metal powder was 33. The inclination of the accumulated grain size distribution was 6. The average grain diameter of the co-material was 29 nm (a specific surface area was 40 $m^2/g$). The standard deviation of the grain diameter of the co-material was 8.7. The inclination of the accumulated grain size distribution of the co-material was 5.

TABLE 1

| | | AVERAGE GRAIN DIAMETER | STANDARD DEVIATION | INCLINATION OF ACCUMULATED GRAIN SIZE DISTRIBUTION |
|---|---|---|---|---|
| EXAMPLES 1 TO 6, COMPARATIVE EXAMPLES 1 TO 4 | MAIN COMPONENT METAL | 70 nm | 12 | 8 |
| | CO-MATERIAL | 8.6 nm | 2.7 | 7 |
| EXAMPLE 7 | MAIN COMPONENT METAL | 120 nm | 33 | 6 |
| | CO-MATERIAL | 29 nm | 8.7 | 5 |

The conductive paste for forming the internal electrode layer was screen-printed on the dielectric green sheet. 250 of the dielectric green sheets on which the conductive paste for forming the internal electrode layer was printed were stacked, and cover sheets were stacked on the stacked dielectric green sheets and under the stacked dielectric green sheets. After that, a ceramic multilayer structure was obtained by a thermal compressing. And the ceramic multilayer structure was cut into a predetermined size.

The binder was removed from the ceramic multilayer structure in $N_2$ atmosphere. After that, the metal paste including the metal filler of which a main component was Ni, the co-material, the binder and the solvent was coated from the both edge faces to the side faces of the ceramic multilayer structure and was dried. After that, the resulting multilayer structure was baked together with the metal paste for 10 minutes to 2 hours in a reductive atmosphere in a temperature range of 1100 degrees C. to 1300 degrees C. And, a sintered structure was formed. The average speed of temperature increasing from a room temperature to a maximum temperature was 55 degrees C./minute in the examples 1 to 7 and the comparative examples 1 to 3. The average speed of temperature increasing from a room temperature to a maximum temperature was 30 degrees C./minute in the example 4. In the example 6, the maximum temperature was lower than that of the examples 1 to 5 and 7 and the comparative example 1, by approximately 100 degrees C. In the comparative example 2, the maximum temperature was lower than that of the examples 1 to 5 and 7 and the comparative example 1, by approximately 50 degrees C. In the comparative examples 3 and 4, the maximum temperature was lower than that of the examples 1 to 5 and 7 and the comparative example 1, by approximately 100 degrees C.

The resulting sintered structure had a length of 0.6 mm, a width of 0.3 mm and a height of 0.3 mm. The sintered structure was subjected to a re-oxidation process at 800 degrees C. in $N_2$ atmosphere. After that, by a plating process, a Cu-plated layer, a Ni-plated layer and a Sn-plated layer were formed on a surface of a ground layer of the external electrodes 20a and 20b. And, the multilayer ceramic capacitor 100 was obtained.

(Analysis)

Figure 6A:
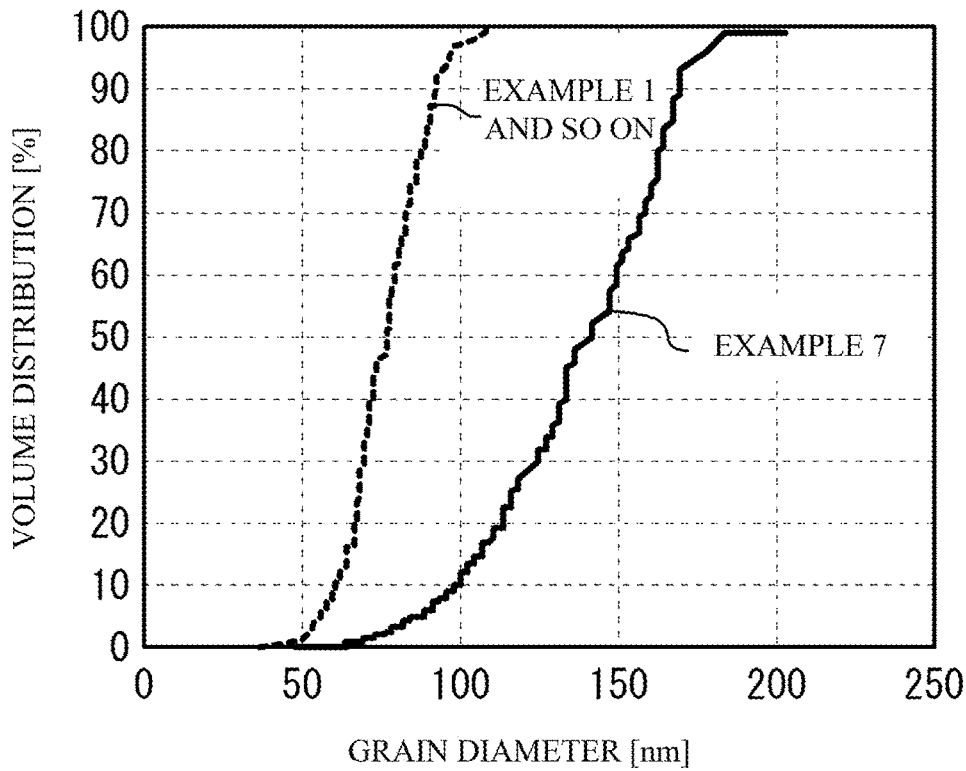
FIG. 6A illustrates grain size distribution of a main component metal of a conductive paste for forming an internal electrode of examples 1 to 7 and comparative examples 1 to 4.
Figure 6B:
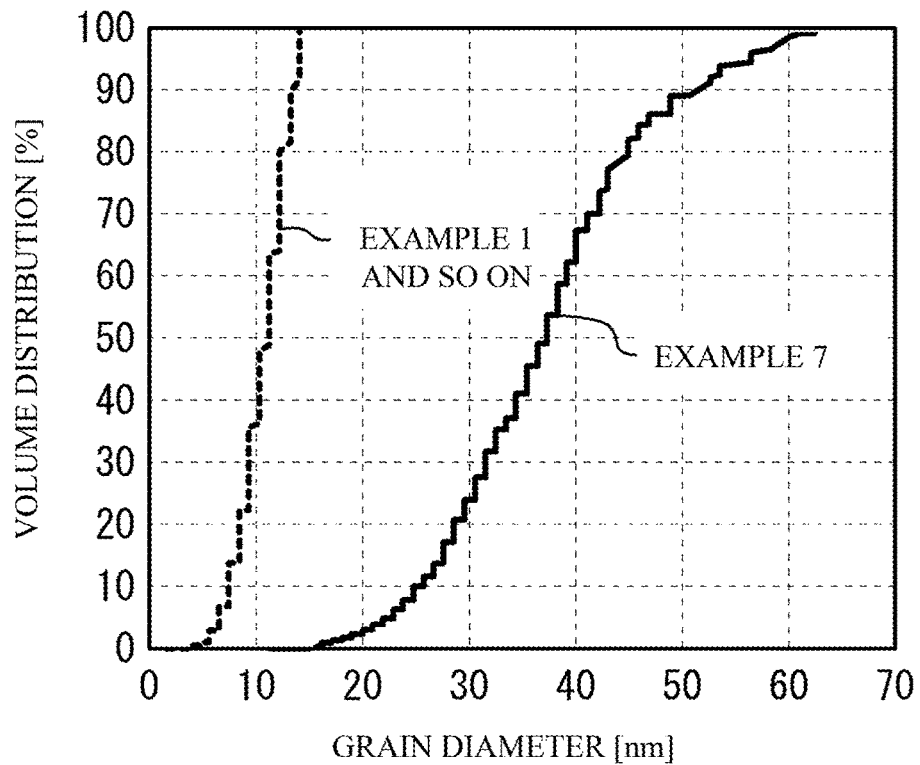
FIG. 6B illustrates grain size distribution of co-materials of a conductive paste for forming an internal electrode of examples 1 to 7 and comparative examples 1 to 4.

FIG. 6A illustrates grain size distribution of the main component metal of the conductive paste for forming the internal electrode layer of the examples 1 to 6 and the comparative examples 1 to 4 and grain size distribution of the main component metal of the conductive paste for forming the internal electrode layer of the example 7. In FIG. 6A, "EXAMPLE 1 AND SO ON" corresponds to the examples 1 to 6 and the comparative examples 1 to 4. As illustrated in FIG. 6A, in the examples 1 to 6 and the comparative examples 1 to 4, a metal powder of which the average grain diameter was small and of which grain size distribution was sharp was used. In the example 7, a metal powder of which the average grain diameter was large and of which the grain size distribution was broad was used. FIG. 6B illustrates the grain size distribution of the co-material of the conductive paste for forming the internal electrode layer of the examples 1 to 6 and the comparative examples 1 to 4 and the co-material of the conductive paste for forming internal electrode layer of the example 7. In FIG. 6B, "EXAMPLE 1 AND SO ON" corresponds to the examples 1 to 6 and the comparative examples 1 to 4. As illustrated in FIG. 6B, in the examples 1 to 6 and the comparative examples 1 to 4, the average grain diameter of the co-material was small, and the grain size distribution of the co-material was sharp. In the example 7, the average grain diameter of the co-material was large, and the grain size distribution of the co-material was broad.

Figure 7:
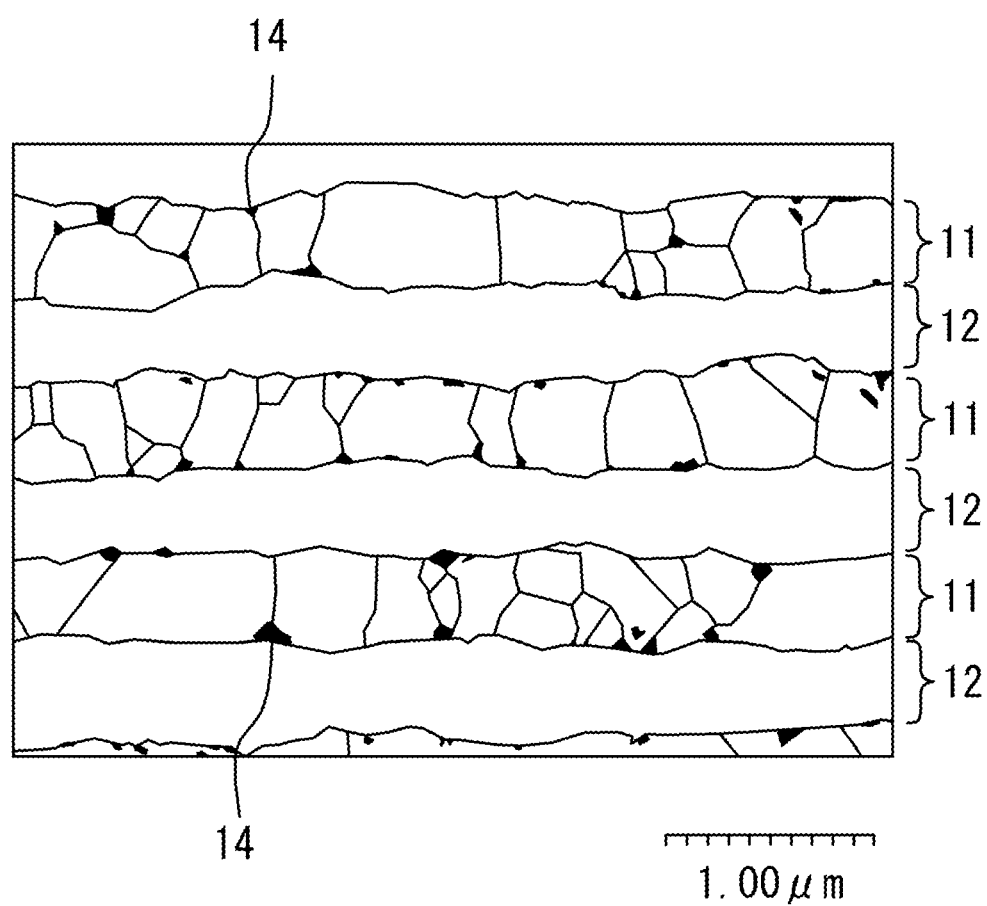
FIG. 7 illustrates a SEM image of a cross sections of a dielectric layer and an internal electrode layer in a stacking direction.

FIG. 7 illustrates a SEM (Scanning Electron Microscope) image of the cross section of the dielectric layers 11 and the internal electrode layers 12 in the stacking direction in a center portion of a width direction in the example 2. From the result of FIG. 7, it was confirmed that the second-phase 14 was formed in the interface between the dielectric layers 11 and the internal electrode layers 12. When the second-phase 14 was analyzed with use of EDS (Energy Dispersive X-ray Spectrometry), it was confirmed that the second-phase 14 included Si. From the result of FIG. 7, the average diameter of the second-phases 14 was measured. In concrete, long diameters of 200 numbers of the second-phases 14 randomly selected from the SEM image were measured. An average of the 200 long diameters was calculated as the average diameter. Table 2 and Table 3 illustrate the result. The measured results other then the example 2 of FIG. 7 were measured results that are measured in the same manner.

TABLE 3

|  | RELATIVE DIELECTRIC CONSTANT | SUPPRESSION OF CRACK | AREA RATIO OF CERAMIC GRAINS (%) |
|---|---|---|---|
| EXAMPLE 1 | 2800 | ○ | — |
| EXAMPLE 2 | 3300 | ○ | 16.2 |
| EXAMPLE 3 | 2900 | ○ | — |
| EXAMPLE 4 | 3200 | ○ | — |
| EXAMPLE 5 | 2700 | ○ | — |
| EXAMPLE 6 | 2500 | ○ | — |
| EXAMPLE 7 | 2600 | ○ | 8.7 |
| COMPARATIVE EXAMPLE 1 | 2400 | ○ | — |
| COMPARATIVE EXAMPLE 2 | — | x | — |
| COMPARATIVE EXAMPLE 3 | 2000 | ○ | — |
| COMPARATIVE EXAMPLE 4 | — | x | — |

As shown in Table 2 and Table 3, in the examples 1 to 7, the relative dielectric constant was 2500 or more. "2500" is a target value. It is thought that this was because the second-phase 14 having the average diameter of 150 nm or less was formed in the interface between the dielectric layers 11 and the internal electrode layers 12. On the other hand, in the comparative examples 1 and 3, the relative dielectric constant was lower than 2500. It is thought that this was because the average diameter of the second-phases 14 was larger than 150 nm, the second-phases 14 were not distributed, and the diffusion of the co-material was not suppressed. In the comparative examples 2 and 4, a crack was occurred by the baking, and the relative dielectric constant was not measured. It is thought that this was because the average diameter of the second-phase 14 was larger than 150 nm, and the second-phases 14 were not distributed. And, it is thought that this was because the average diameter of the second phases 14 was larger than 35% of the average grain diameter of the main component ceramic of the dielectric layers 11, and the number of the second-phases 14 located in the interface between the dielectric layers 11 and the internal electrode layers 12 was small. The average grain diameter of the main component ceramic of the dielectric layers 11 was an average value of measured long diameters of 200 number of main component ceramic grains that were observed from the SEM image and were randomly selected.

TABLE 2

|  | AMOUNT OF SiO$_2$(mol) (BaTiO$_3$ = 100 mol) | SiO$_2$ SPECIFIC SURFACE AREA (m$^2$/g) | AVERAGE DIAMETER OF SECOND-PHASE (nm) | AREA RATIO (%) | DIAMETER RATIO OF SECOND-PHASE/ DIELECTRIC MATERIAL (%) |
|---|---|---|---|---|---|
| EXAMPLE 1 | 0.3 | 200 | 50 | 0.8 | 13 |
| EXAMPLE 2 | 0.4 | 200 | 70 | 0.9 | 20 |
| EXAMPLE 3 | 0.7 | 200 | 80 | 1.7 | 20 |
| EXAMPLE 4 | 2.0 | 200 | 150 | 5.0 | 30 |
| EXAMPLE 5 | 2.1 | 200 | 150 | 5.1 | 32 |
| EXAMPLE 6 | 0.7 | 200 | 80 | 2.0 | 35 |
| EXAMPLE 7 | 0.4 | 200 | 70 | 0.9 | 20 |
| COMPARATIVE EXAMPLE 1 | 2.5 | 200 | 160 | 5.5 | 28 |
| COMPARATIVE EXAMPLE 2 | 0.4 | 50 | 200 | 1.5 | 40 |
| COMPARATIVE EXAMPLE 3 | 0.4 | 50 | 200 | 2.0 | 30 |
| COMPARATIVE EXAMPLE 4 | 0.2 | 200 | 160 | 0.6 | 36 |

The relative dielectric constants of the examples 2 to 4 were larger than that of the example 1. It is thought that this was because the total area of the second-phases 14 was 0.9% or more with respect to the total area of the dielectric layers 11, in the cross section in the stacking direction of the dielectric layers 11 and the internal electrode layers 12, and the diffusion of the co-material was sufficiently suppressed. The total area of the second-phases 14 was measured by using a rectangular region of 12.6 μm×8.35 μm obtained by adjusting a magnification of a visual field of the SEM image of the cross section observed as FIG. 7. All observed grains of the second phases 14 were considered as circles of which diameter were long diameters of the grains. All areas of the circles were calculated. The total of the calculated areas was used as the total area of the second-phases 14. A straight line was extrapolated in the interface between the dielectric layers 11 and the internal electrode layers 12, in the rectangular region of the same visual field of the SEM image. An area of the dielectric layers 11 surrounded by the straight line and an outer circumference of the rectangular region was calculated, and a total area of all dielectric layers 11 of the rectangular region was calculated as the total area of the dielectric layers 11. It is possible to calculated a ratio of the total area of the second-phases 14 and the total area of the dielectric layers 11. The ratio may be an average value of three ratios of different rectangular regions of one product. The rectangular region was selected from a center one of three regions obtained by dividing the cross section in which the internal electrode layers 12 face with each other and a capacity is generated, into three regions in the stacking direction and the extension direction of the internal electrode layers 12.

Area ratios of the grains 16 of which a main component was ceramic was measured in the cross section of the internal electrode layers 12 in the stacking direction of the dielectric layers 11 and the internal electrode layers 12, in the examples 2 and 7. In concrete, the total area of the grains 16 was measured by using a rectangular region of 12.6 μm×8.35 μm obtained by adjusting a magnification of a visual field of the SEM image. All observed grains 16 were considered as circles of which diameter were long diameters of the grains. All areas of the circles were calculated. The total of the calculated areas was used as the total area of the grains 16. A straight line was extrapolated in the interface between the dielectric layers 11 and the internal electrode layers 12. An area of the internal electrode layers 12 surrounded by the straight line and an outer circumference of the rectangular region was calculated, and a total area of all internal electrode layers 12 of the rectangular region was calculated as the total area of the internal electrode layers 12. An area ratio was calculated by calculating the total area of the grains 16 with respect to the total area of the internal electrode layers 12 (including the grains 16). The area ratio may be an average value of three ratios of different rectangular regions of one product. The rectangular region was selected from a center one of three regions obtained by dividing the cross section in which the internal electrode layers 12 face with each other and a capacity is generated, into three regions in the stacking direction and the extension direction of the internal electrode layers 12. As shown in Table 2 and Table 3, the area ratio of the example 2 was 16.2. The area ratio of the example 7 was 8.7. It is thought that this was because the small diameter material of which grain size distribution was sharp was used as the metal material and the co-material of the metal conductive paste for forming the internal electrode layers, the co-material was remained in the internal electrode layers 12 during the sintering, and the diffusion of the co-material into the dielectric layers 11 was suppressed. The relative dielectric constant of the example 2 was larger than that of the example 7. It is thought that this was because the area ratio of the grains 16 was 10% or more, the amount of the co-material remained in the internal electrode layers 12 increased, the diffusion of the co-material into the dielectric layers 11 was suppressed, and the reduction of the relative dielectric constant of the dielectric layers 11 was suppressed. And, the continuity modulus described on the basis of FIG. 2 was measured with use of the obtained SEM image. In the examples 1 to 6, the continuity was 100%. In the example 7, the continuity modulus was 96%. There values are very high. A plurality of SEM images of the whole region of 10 numbers of the internal electrode layers 12 in the extension direction observed in a product cross section were captured. The plurality of SEM images were pasted together. Thereby, the 10 numbers of the internal electrode layers 12 can be seen in the pasted images. Next, L0, L1, L2 . . . of the internal electrode layers were calculated. And each continuity was calculated with respect to each internal electrode layer. An average of the continuity modulus of the 10 numbers of the internal electrode layers was calculated. The magnification of the SEM image may be selected from 5000 to 50000 in accordance with a specification of a product or a purpose of measuring.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a multilayer structure in which each of dielectric layers and each of internal electrode layers are alternately stacked, a main component of the dielectric layers being ceramic,
   wherein:
   a second-phase has an average diameter of 150 nm or less and is in at least one of interfaces between the dielectric layers and the internal electrode layers;
   at least one of the internal electrode layers includes a grain of which a main component is ceramic; and
   a total area of the second-phase is 0.8% or more and 5.1% or less with respect to a total area of the dielectric layers, in a cross section of the dielectric layers and the internal electrode layers in a stacking direction of the dielectric layers and the internal electrode layers.

2. The multilayer ceramic capacitor as claimed in claim 1, wherein an average diameter of the second-phase is an average value of long diameters of 200 numbers of second-phases.

3. The multilayer ceramic capacitor as claimed in claim 1, wherein the average diameter of the second-phase is 35% or less with respect to an average grain diameter of a main component ceramic of the dielectric layers.

4. The multilayer ceramic capacitor as claimed in claim 3, wherein the average grain diameter of the main component ceramic of the dielectric layers is an average value of long diameters of 200 numbers of main component ceramic grain of the dielectric layers.

5. The multilayer ceramic capacitor as claimed in claim 1, wherein the second-phase includes Si.

6. The multilayer ceramic capacitor as claimed in claim 1, wherein an area ratio of the grain is 10% or more in a cross section of the internal electrode layers in the stacking direction of the dielectric layers and the internal electrode layers.

7. The multilayer ceramic capacitor as claimed in claim 1, wherein a main component metal of the internal electrode layers is nickel.

8. The multilayer ceramic capacitor as claimed in claim 1, wherein the main component ceramic of the grain is barium titanate.

9. The multilayer ceramic capacitor as claimed in claim 1, wherein the main component ceramic of the dielectric layers is barium titanate.

10. The multilayer ceramic capacitor as claimed in claim 1, wherein the grain exists neither in an uppermost 5% nor in a lowermost 5% in the at least one of the internal electrode layers in a thickness direction.

11. A multilayer ceramic capacitor comprising:
a multilayer structure in which each of dielectric layers and each of internal electrode layers are alternately stacked, a main component of the dielectric layers being ceramic,
wherein:
a second-phase has an average diameter of 150 nm or less and is in at least one of interfaces between the dielectric layers and the internal electrode layers;
at least one of the internal electrode layers includes a grain of which a main component is ceramic; and
the average diameter of the second-phase is an average value of long diameters of 200 numbers of second-phases.

12. A multilayer ceramic capacitor comprising:
a multilayer structure in which each of dielectric layers and each of internal electrode layers are alternately stacked, a main component of the dielectric layers being ceramic,
wherein:
a second-phase has an average diameter of 150 nm or less and is in at least one of interfaces between the dielectric layers and the internal electrode layers;
at least one of the internal electrode layers includes a grain of which a main component is ceramic;
the average diameter of the second-phase is 35% or less with respect to an average grain diameter of a main component ceramic of the dielectric layers; and
the average grain diameter of the main component ceramic of the dielectric layers is an average value of long diameters of 200 numbers of main component ceramic grain of the dielectric layers.

* * * * *